(12) United States Patent
Wei (10) Patent No.: US 9,258,091 B2
(45) Date of Patent: Feb. 9, 2016

(54) RESOURCE ALLOCATION METHOD AND DEVICE IN COMMUNICATION NETWORK

(75) Inventor: Yuxin Wei, Beijing (CN)

(73) Assignee: Sony Corporation, Tokyo (JP)

( * ) Notice: Subject to any disclaimer, the term of this patent is extended or adjusted under 35 U.S.C. 154(b) by 554 days.

(21) Appl. No.: 13/500,079

(22) PCT Filed: Oct. 28, 2010

(86) PCT No.: PCT/CN2010/078191
§ 371 (c)(1),
(2), (4) Date: Apr. 4, 2012

(87) PCT Pub. No.: WO2011/050729
PCT Pub. Date: May 5, 2011

(65) Prior Publication Data
US 2012/0198077 A1    Aug. 2, 2012

(30) Foreign Application Priority Data
Oct. 30, 2009    (CN) .......................... 2009 1 0207777

(51) Int. Cl.
*H04L 5/00*    (2006.01)
(52) U.S. Cl.
CPC .............. *H04L 5/0044* (2013.01); *H04L 5/006* (2013.01); *H04L 5/001* (2013.01); *H04L 5/0039* (2013.01); *H04L 5/0041* (2013.01)
(58) Field of Classification Search
CPC ..... H04L 5/001; H04L 5/0039; H04L 5/0041; H04L 5/0044; H04L 5/006
USPC ....................................................... 709/226
See application file for complete search history.

(56) References Cited

U.S. PATENT DOCUMENTS

| | | | |
|---|---|---|---|
| 2005/0193116 A1* | 9/2005 | Ayyagari et al. ............... | 709/226 |
| 2007/0220151 A1* | 9/2007 | Li et al. .......................... | 709/226 |
| 2008/0187005 A1* | 8/2008 | Chauviere et al. ............. | 370/480 |
| 2009/0016273 A1* | 1/2009 | Kanterakis ..................... | 370/328 |
| 2010/0279628 A1* | 11/2010 | Love et al. ...................... | 455/70 |
| 2010/0296473 A1 | 11/2010 | Kim et al. | |
| 2010/0312894 A1* | 12/2010 | Awad et al. .................... | 709/226 |
| 2010/0331006 A1* | 12/2010 | Cho et al. ....................... | 455/450 |
| 2011/0141928 A1* | 6/2011 | Shin et al. ...................... | 370/252 |

FOREIGN PATENT DOCUMENTS

| | | |
|---|---|---|
| CN | 1829131 | 9/2006 |
| CN | 101064638 A | 10/2007 |

OTHER PUBLICATIONS

3GPP TSG RAN WG1 #56bis R1-091204, "UL control channel design to support carrier aggregation," LG Electronics, Total 6 Pages, (Mar. 23-27, 2009).

(Continued)

*Primary Examiner* — Michael C Lai
(74) *Attorney, Agent, or Firm* — Oblon, McClelland, Maier & Neustadt, L.L.P.

(57) ABSTRACT

A resource allocation method and device in a communication network. The method includes: determining the carrier aggregation (CA) mode of the communication network; and selecting a resource allocating mode for the communication network according to the CA mode of the communication network. The method can select different resource scheduling modes according to different CA scenarios, thereby providing system frequency diversity gain and multi-user diversity gain.

22 Claims, 7 Drawing Sheets (56) References Cited

OTHER PUBLICATIONS

TSG RAN WG1 #56bis R1-091427, "Uplink Control Channel Design for LTE-Advanced," ZTE, Total 6 Pages, (Mar. 23-27, 2009).

3GPP TSG RAN WG1 Meeting #56 R1-090984, "Initial Uplink Access Procedure in LTE-Advanced," ZTE, Total 5 Pages, (Feb. 9-13, 2009).

International Search Report Issued Feb. 10, 2011 in PCT/CN10/78191 Filed Oct. 28, 2010.

* cited by examiner

RESOURCE ALLOCATION METHOD AND DEVICE IN COMMUNICATION NETWORK

TECHNICAL FIELD

The invention relates to the field of communications, and in particular, to a method and apparatus for allocating resources a in the communication network.

BACKGROUND

Under the case that the recourses of a communication network is limited, a resource scheduling algorithm may be used to allocate the available resources in the communication network flexibly according to the user's requirements and the channel properties, thereby improving the utilization efficiency of the radio frequency spectrums. Due to the emergence of the carrier aggregation technologies, conventional resource scheduling algorithms do not meet the new requirements. A scheduling method under carrier aggregation is critical for improving the whole system performance and faces many challenges.

CHENG et al. presented in "*Study of performance of carrier aggregation technology in LTE-Advanced system*" (*Modern Communications Science and Technology*, Vol. 4, April, 2009) a method of combined queue scheduling to be applied in the case of carrier aggregation, in which it is supposed that the base station side has a combined queue scheduler, i.e. data on a plurality of carriers share the same queue. All the carriers share a same resource scheduler which allocates the user accessed to the system directly with the resource blocks of a plurality of separate carriers.

SUMMARY

The following presents a simplified summary of the disclosure in order to provide a basic understanding of some aspects of the disclosure. This summary is not an exhaustive overview of the disclosure. It is not intended to identify key or critical elements of the disclosure or to delineate the scope of the disclosure. Its sole purpose is to present some concepts in a simplified form as a prelude to the more detailed description that is discussed later.

According to an aspect of the invention, there is provided a method for allocating resources in a communication network. The method for allocating resources may include: determining a carrier aggregation mode of the communication network; and selecting a resource allocating mode for the communication network according to the carrier aggregation mode of the communication network.

According to another aspect of the invention, there is provided an apparatus for allocating resources in a communication network, The apparatus for allocating resources may include: an aggregation mode determining module, configured to determine a carrier aggregation mode of the communication network; and an allocating mode selecting module, configured to select a resource allocating mode for the communication network according to the carrier aggregation mode of the communication network.

In addition, an embodiment of the invention provides computer program for realizing the above method for allocating resources.

Furthermore, an embodiment of the invention provides a computer program product in the form of computer readable medium on which there are recorded computer program codes for the above method for allocating resources.

BRIEF DESCRIPTION OF THE DRAWINGS

The above and other objects, features and advantages of the embodiments of the disclosure can be better understood with reference to the description given below in conjunction with the accompanying drawings, throughout which identical or like components are denoted by identical or like reference signs. In addition the components shown in the drawings are merely to illustrate the principle of the disclosure. In the drawings.

DETAILED DESCRIPTION

Some embodiments of the present disclosure will be described in conjunction with the accompanying drawings hereinafter. It should be noted that the elements and/or features shown in a drawing or disclosed in an embodiments may be combined with the elements and/or features shown in one or more other drawing or embodiments. It should be further noted that some details regarding some components and/or processes irrelevant to the disclosure or well known in the art are omitted for the sake of clarity and conciseness.

The future LTE-A (Long Term Evolution-Advanced) system will support a transmission bandwidth up to 100 MHz, while in the conventional LTE standard the maximum supportable transmission bandwidth is only 20 MHz. Thus it requires aggregating a plurality of component carriers to obtain a wider transmission bandwidth. Carrier Aggregation is a technology presented by 3GPP, in which a plurality of component carriers may be aggregated for transmission in order to support the much higher requirements of the future mobile communication systems in transmission bandwidth. The modes of Carrier Aggregation may be classified as two types, i.e. consecutive carrier aggregation and non-consecutive carrier aggregation, based on the positions of the aggregated component carriers on spectrum. LTE-A supports both of the two types. 3GPP also considers the backward compatibility when presenting the carrier aggregation technology, which means that the terminals supporting carrier aggregation will coexist with those not supporting carrier aggregation within a long period in the future. A terminal supporting carrier aggregation can access a plurality of component carriers, while a terminal not supporting carrier aggregation can access only one component carrier. Some embodiments of the invention provide methods and apparatuses for resources scheduling in the case that carrier aggregation is supported.

In the case of carrier aggregation, especially the non-consecutive carrier aggregation, when a plurality of aggregated component carriers are located in different frequency bands, the electro-magnetic transmission property respectively of each component carriers is different. The methods and apparatuses for resources scheduling according to some embodiments of the invention consider and take advantage of such a case in order to improve the system performance. The methods and apparatuses for resources scheduling according to some embodiments of the invention consider also considers the variety of the terminals (supporting or not supporting carrier aggregation and the performance differences for different component carriers of the users) as well as the scheduling fairness thus caused. In addition, how to take advantage of the frequency selection gain caused by the carrier aggregation and improve multi-user diversity gain so as to improve the overall system performance is also considered in some methods and apparatuses for resources allocation according to some embodiments of the invention.

Figure 1:
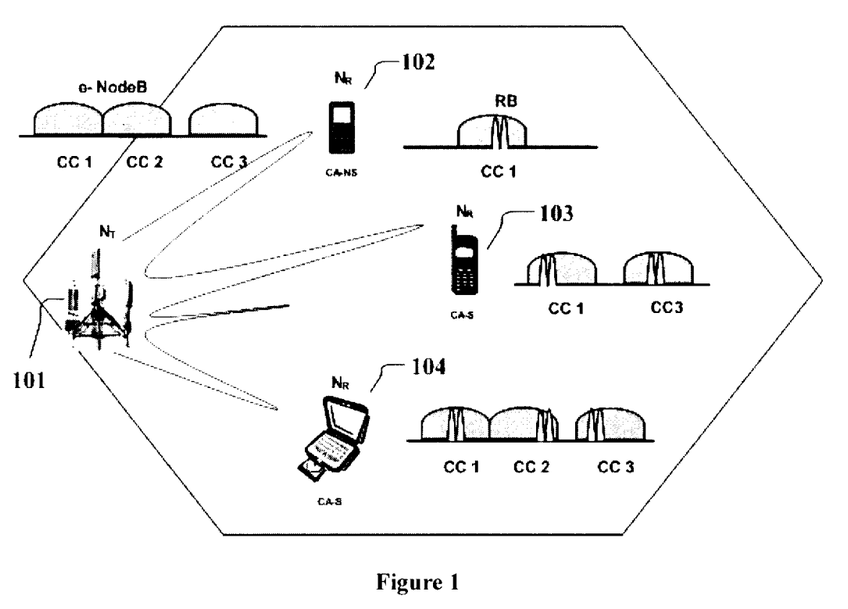
FIG. 1 is a schematic diagram illustrating a communication network supporting carrier aggregation.

FIG. 1 illustrates a communication network supporting carrier aggregation. As shown in FIG. 1, in a cell a base station (e.g. e-NodeB) 101 provide services for a plurality of users 102, 103 and 104. Some of the users, such as user 102, do not support carrier aggregation (CA-NS); and some users, such as users 103 and 104, support carrier aggregation (CA-S). The carrier aggregation mode supported by the communication network is decided by the base station. For example, in the example of FIG. 1, the component carriers supported by the communication network include CC1, CC2 and CC3. The component carrier CC1 is consecutive to the component carrier CC2, and the component carrier CC3 is non-consecutive to the component carriers CC1 and CC2. It should be noted that in the specification the so called "user" refers to a user terminal, such as the mobile equipment (e.g. a mobile phone such as 102 and 103 shown in FIG. 1, a personal digital assistant or a portable computer, or the like) used by a person to access a communication network.

A resource allocating (scheduling) method is used to allocate resources, such as the resource blocks (RBs) shown in FIG. 1, for users requesting services. In particular, for a user which does not support carrier aggregation, the resources that can be occupied by the user are determined among the component carrier supported by the user. For a user which supports carrier aggregation, the component carriers supported by the user and the resources therein that can be occupied by the user are determined. For example, in FIG. 1, the terminal 102 can only use the resources on the component carrier CC1, the terminal 103 supports the component carriers CC1 and CC3, and the terminal 104 supports the component carriers CC1, CC2 and CC3.

Figure 2:
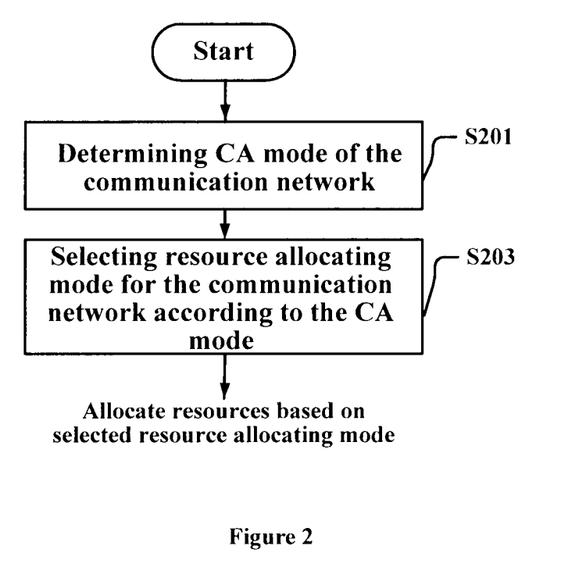
FIG. 2 is a schematic flow chart showing the method of allocating resources according to an embodiment of the invention.

FIG. 2 is a schematic flow chart showing the method of allocating resources according to an embodiment of the invention.

As shown in FIG. 2, the method of allocating resources may include steps S201 and S203.

In step S201, the carrier aggregation mode of the communication network is determined.

The communication network described herein refers to a communication system that supports carrier aggregation, for example, the communication network shown in FIG. 1. The communication network may include carrier aggregation non-supporting nodes, such as terminal 102 shown in FIG. 1, as well as carrier aggregation supporting nodes, such as terminals 103 and 104 shown in FIG. 1. As an example, the carrier aggregation mode supported by the communication network may be determined via the main node (for example, the base station) of the communication network. For example, information of the carrier aggregation mode may be obtained from the corresponding configuration file of the main node (e.g. the base station), in order to determine the carrier aggregation mode supported by the communication network.

In step S203, the resource allocating mode of the communication network is selected based on the carrier aggregation mode.

In the embodiment, a different method of allocating resources is selected based on the different scenario of carrier aggregation, thereby effectively improving the frequency diversity gain of the system.

Figure 3:
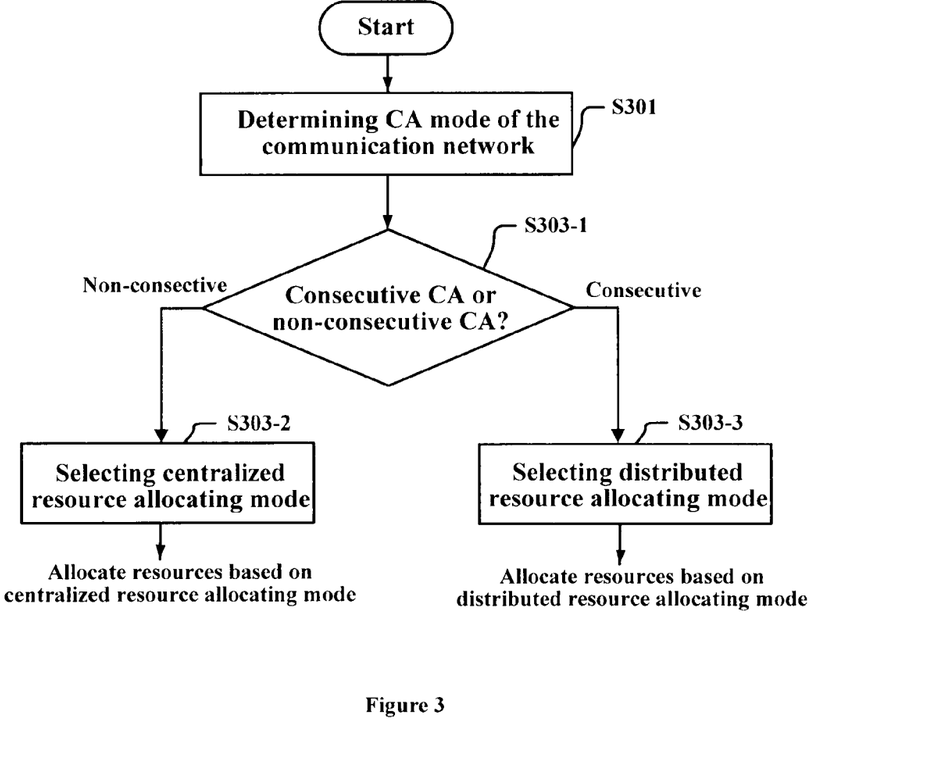
FIG. 3 is a schematic flow chart showing the method of allocating resources according to another embodiment of the invention.

FIG. 3 illustrates an example of the method of allocating resources shown in FIG. 2. As described above, the carrier aggregation modes of the communication network include two types: the consecutive carrier aggregation (CC1 and CC2 shown in FIG. 1) and the non-consecutive carrier aggregation (CC1 and CC3 shown in FIG. 1). In FIG. 3, different resource allocating modes are selected for the two different aggregation modes. In particular, in step S301 the carrier aggregation mode of the communication network is determined. And in step S301-1, it is judged whether the carrier aggregation mode is consecutive or non-consecutive. If it is consecutive, in step S303-1 a distributed resource allocating mode is selected for resource allocation. If it is non-consecutive, in step S303-2 a centralized resource allocating mode is selected for resource allocation in the communication network.

Figure 4:
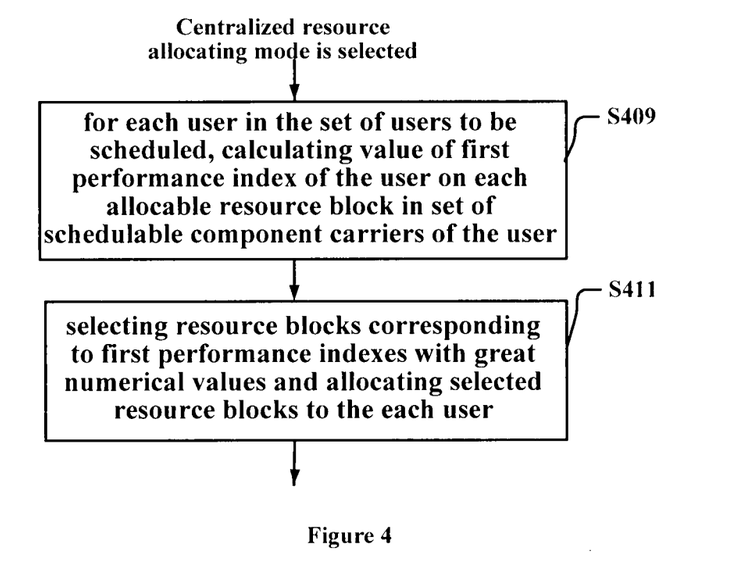
FIG. 4 is a schematic flow chart showing a centralized resource allocating mode according to another embodiment of the invention.

FIG. 4 shows an example of the centralized resource allocating mode in FIG. 3. As shown in FIG. 4, the centralized resource allocating may include steps S409 and S411.

In step S409, for each user in a set of users to be scheduled in the communication network, the performance index (also referred to as the first performance index) of this user on each allocable resource block in a set of component carriers schedulable by the user is calculated. The so called Resource Block (RB) is a minimum transmission unit (time-frequency resource).

The first performance index may be user traffic, channel gain, signal noise ratio, spectrum utilization efficiency or error rate, or the like. As appreciated by those skilled in the art, the first performance index may be selected according to the practical requirements and should not be limited to any particular example. As can be seen, to calculate the first performance index of a user on a resource block in a component carrier is to calculate or estimate the traffic, the channel gain, the signal noise ratio, the spectrum utilization efficiency or the error rate of the user on the resource block. It should be noted, these performance indexes may be calculated or estimated using any appropriate method, the description of which is omitted herein.

A set of schedulable component carriers of a user includes: one or more candidate component carriers which are selected among all component carriers usable by the user and allocated to the user during resource scheduling. In an example, a set of schedulable component carriers of a user may include all the component carriers usable by the user. If the user does not support carrier aggregation, the set of schedulable component carriers of the user is one component carrier usable by the user. In another example, a set of schedulable component carriers of a user may include one or more of the component carrier usable by the user.

In step S411, among all the resource blocks in the set of schedulable component carriers of the user, resource blocks corresponding to a plurality of first performance indexes of large numerical values are selected and allocated to the user. As an example, resource blocks corresponding to the first performance indexes of the largest numerical value may allocated to the user, according to the value of the first performance index of the user on each resource block. As another example, resource blocks corresponding to the first performance indexes of large numerical values (not only the largest) may be allocated to the use. Of course, the above method for selecting resource blocks is only an illustrative example, those skilled in the art shall appreciated that the invention should not be limited to this example.

It should be noted, the number of resource blocks allocated to a user may be determined according to practical requirements, such as the user's requirements, the description of which is omitted herein. It should also be noted, for a user supporting carrier aggregation, the above allocating step may allocate resource blocks in a plurality of component carriers (consecutive or non-consecutive) to the user; and for a user not supporting carrier aggregation, only resource blocks in the component carrier supported by the user can be allocated to the user.

In an example, before allocating a resource block to the user, the following step may be executed: judging whether the user meets the condition (also referred to the first condition) for occupying the resource block. The first condition may include that: component carriers schedulable by the user and resource blocks therein can not be occupied by other users, the number of times that this resource block is multiplexed does not exceed the number of transmission antennas, and/or number of resource blocks occupied by each user does not exceed number of the receiving antennas, and the like. It shall be noted the conditions mentioned here are not exhaustive. Those skilled in the art may use other appropriate conditions in judging whether a user can occupy a resource block and the invention is not limited to the examples.

A particular example is given below for further clarifying the centralized resource allocating mode.

It is supposed that the set of users to be scheduled is $Sch_u$, $u \in Sch_u$, u represents the element (i.e. each user) in the set $Sch_u$, $u=1, \ldots, N$. N is a positive integer, and represents the number of users in the set. It is supposed that the set of component carriers schedulable by the user u in the set of user ($u \in Sch_u$) is $CC_{u,c}$ ($c \in CC_{u,c}$, c represents the element (e.g. each component carrier) in the set $CC_{u,c}$) and the set of all the usable resource blocks on component carrier c in the set $CC_{u,c}$ is $RB_{c,r}$, $r \in RB_{c,r}$. r represents the element (e.g. each resource block) in the set $RB_{c,r}$, $r=1, \ldots, R_c$. $R_c$ is an integer and represents the number of all usable resource blocks in component carrier c.

Firstly, the first performance index $T_{u,c,r}$ of the user u ($u \in Sch_u$) in the set $Sch_u$ on all usable resource block set $RB_{c,r}$ in the set $CC_{u,c}$. The first performance index may be represented as follows:

$$T_{u,c,r}, \exists u \in Sch_u, \forall c \in CC_{u,c}, \forall r \in RB_{c,r}$$

In the above, "$\in$" represents "belong to", for example, $c \in CC_{u,c}$ represents that element c belongs to the set $CC_{u,c}$; "$\exists$" represents "exist", for example, $\exists u \in Sch_u$ represents that at least the element u that belongs to the set $Sch_u$ exists; "$\forall$" represents "arbitrary", for example, $\forall c \in CC_{u,c}$ any element c in the set $CC_{u,c}$. For conciseness the description of these symbols will not be repeated.

As described above, the first performance index $T_{u,c,r}$ may be the user traffic, channel gain, signal noise ratio, spectrum utilization efficiency or error rate or the like and may be selected as required. That is, to calculate the performance index $T_{u,c,r}$ of the user u ($u \in Sch_u$) on the resource block r in a component carrier c of the set of schedulable component carriers $CC_{u,c}$ is to calculate or estimate the user traffic, channel gain, signal noise ratio, spectrum utilization efficiency or error rate of the user on the resource block. It should be noted, these performance indexes may be calculated or estimated using any appropriate method, the description of which is omitted herein.

The calculated first performance indexes $T_{u,c,r}$ may be sorted based on the values thereof in a numerical descending order, and the component carriers and the resource blocks therein corresponding to top K (K≥1) first performance indexes may be allocated to the user u. Those skilled in the art shall appreciate that K may be determined as required (For example, based on the user's requirements on resources), the description of which is omitted.

In an example, before allocating a resource block to the user, it may be checked whether the user u meets the condition (i.e. the first condition) for occupying the component carrier c and the resource blocks therein. As described above, the first condition may include: component carrier c and the resource blocks therein can not be occupied by other users, the number of times the resource block being multiplexed does not exceed the number of transmission antennas, and/or the number of resource blocks occupied by each user does not exceed the number of receiving antennas, and the like. If the condition is met, the component carrier c and the resource blocks therein may be allocated to the user u.

Figure 5:
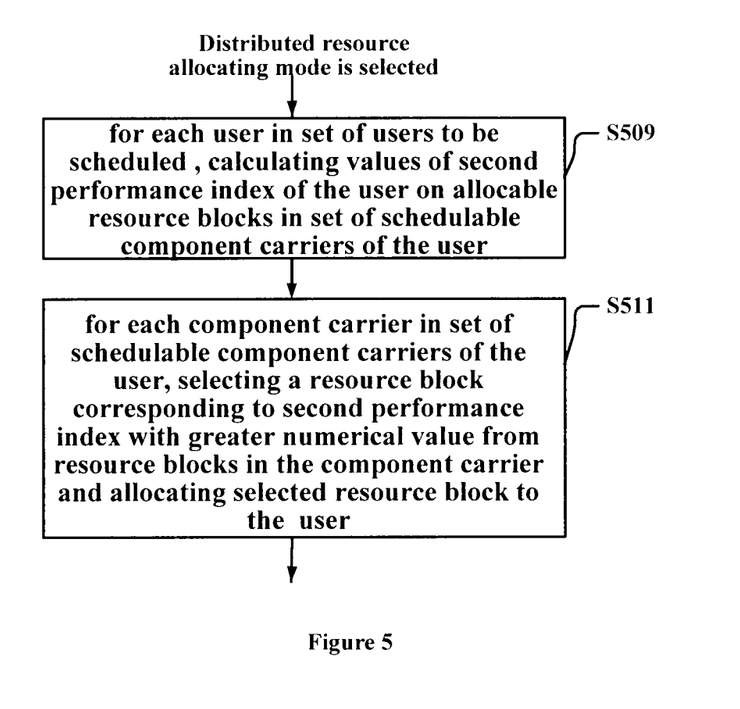
FIG. 5 is a schematic flow chart showing a distributed resource allocating mode according to an embodiment of the invention.

FIG. 5 illustrates an example of the distributed resource allocating mode shown in FIG. 3. As shown in FIG. 5, the distributed resource allocation may include steps S509 and S511.

In step 509, the performance indexes (also referred to as the second performance index) of each user in the set of users to be scheduled in the communication network on the allocable resource blocks in the set of schedulable component carriers of the user are calculated respectively.

The second performance index may be user traffic, channel gain, signal noise ratio, spectrum utilization efficiency or error rate, or the like. Those skilled in the art shall appreciate that these indexes can be selected according to practical requirements, the description of which is omitted herein. To calculate the second performance index of a user on an allocable resource block in a component carrier is to calculate or estimate the traffic, the channel gain, the signal noise ratio, the spectrum utilization efficiency or the error rate of the user on the resource block. It should be noted, these performance indexes may be calculated or estimated using any appropriate method, the description of which is omitted herein.

In step 511, among the resource blocks of each schedulable component carrier of the user, the resource blocks corresponding to second performance index with large values are selected and allocated to the user. As an example, a plurality of resource blocks in each component carrier in the set of schedulable component carriers of the user may be sorted according to the numerical values of the corresponding second performance indexes, and the resource blocks corresponding to the largest second performance index may be allocated to the user. As another example, among the plurality of resource blocks in each component carrier, the resource blocks corresponding to large second performance index (not only the largest) may be selected for the user according to the practical requirements. Of course, the method for selecting resource blocks is only illustrative. Those skilled in the art shall appreciate that the invention is not limited to the example.

It should be noted that in the above allocating step 511, for a user supporting carrier aggregation, the resource blocks to be allocated to the user may be selected among all the component carriers in the set of component carriers supported by the user; while for a user that does not support carrier aggregation, the resource blocks to be allocated to the user can be selected in only a certain component carrier supported by the user.

As an example, after the step S511 is executed for all the users in the set of users to be scheduled, if the communication network still has some schedulable resources remained and some users' resource requirements have not been met, the step S511 may be executed to allocate the remaining resources to the users.

In an example, before allocating a resource block to the user, the following steps may be executed: judging whether the user meets the condition (also referred to as the second condition) for occupying the resource block. The second condition may include the following: the component carriers schedulable by the user and the resource blocks therein can not be occupied by other users, the number of times that the resource block is multiplexed does not exceed the number of transmission antennas, and/or the number of resource blocks occupied by each user does not exceed the number of receiving antennas, and the like. It should be noted that the conditions mentioned herein are illustrative, rather than exhaustive. Those skilled in the art may utilize other conditions in judging whether the user may occupy a certain resource block and the invention is not limited to the example.

A particular example is provided below to further describe the distributed resource allocating mode.

It is supposed that the set of users to be scheduled is $Sch_u$, $u \in Sch_u$. u represents the element (i.e. the users) in the set of users $Sch_u$, $u=1, \ldots, N$. N is a positive integer and represents the number of users in the set. It is further supposed that the set of schedulable component carriers of the user u ($u \in Sch_u$) in the set of users is $CC_{u,c}$.

In addition, for a component carriers c in the set of schedulable component carriers $CC_{u,c}$ ($c \in CC_{u,c}$), it is supposed that the set of all the usable resource blocks in the component carrier c is $RB_{c,r}$, $r \in RB_{c,r}$. r represents the element (i.e. the resource blocks) in the set $RB_{c,r}$, $r=1, \ldots, R_c$. $R_c$ is an integer and represents the number of usable resource blocks in the component carrier c. The performance indexes $T_{u,c,r}$ of the user u on the set of all the usable resource blocks $RB_{c,r}$ in all schedulable component carriers c ($c \in CC_{u,c}$) are calculated, respectively:

$$T_{u,c,r}, \exists u \in Sch_u, \forall c \in CC_{u,c}, \forall r \in RB_{c,r}$$

As described above, the above performance index $T_{u,c,r}$ may be user traffic, channel gain, signal noise ratio, spectrum utilization efficiency or error rate, or the like. In other words, to calculate the performance index $T_{u,c,r}$ of the user u on the resource block r in the component carrier c is to calculate or estimate the user traffic, channel gain, signal noise ratio, spectrum utilization efficiency or error rate of the user on the resource block. It should be noted that these performance indexes may be calculated by using an appropriate method according to the practical requirements, the description of which is omitted here.

The performance indexes $T_{u,c,r}$ of the user on all schedulable resource blocks in each component carrier c may be sorted based on their values in for example a descending order and the resource block r corresponding to the largest $T_{u,c,r}$ may be selected, i.e.:

$$r = \arg\max(T_{u,c,r}), u \in Sch_u, c \in CC_{u,c}, \forall r \in RB_{c,r}$$

This resource block may be allocated to the user. Then the above process may be repeated for the next component carrier in the set of schedulable component carriers of the user, until all the component carriers in the set of schedulable component carriers of the user have been processed to select resource blocks therein.

In the example, before allocating a resource block to the use, it may be further checked whether the user u meets the condition for occupying the component carrier c and the resource block r therein. The condition may include: the component carrier c and the resource block r therein can not be occupied by other users, the number of times that the resource block r is multiplexed does not exceed the number of transmission antennas, and/or the number of resource blocks occupied by each user does not exceed the number of receiving antenna, and the like. If the condition is met, the component carrier c and the resource block r therein are allocated to the user u.

Figure 6:
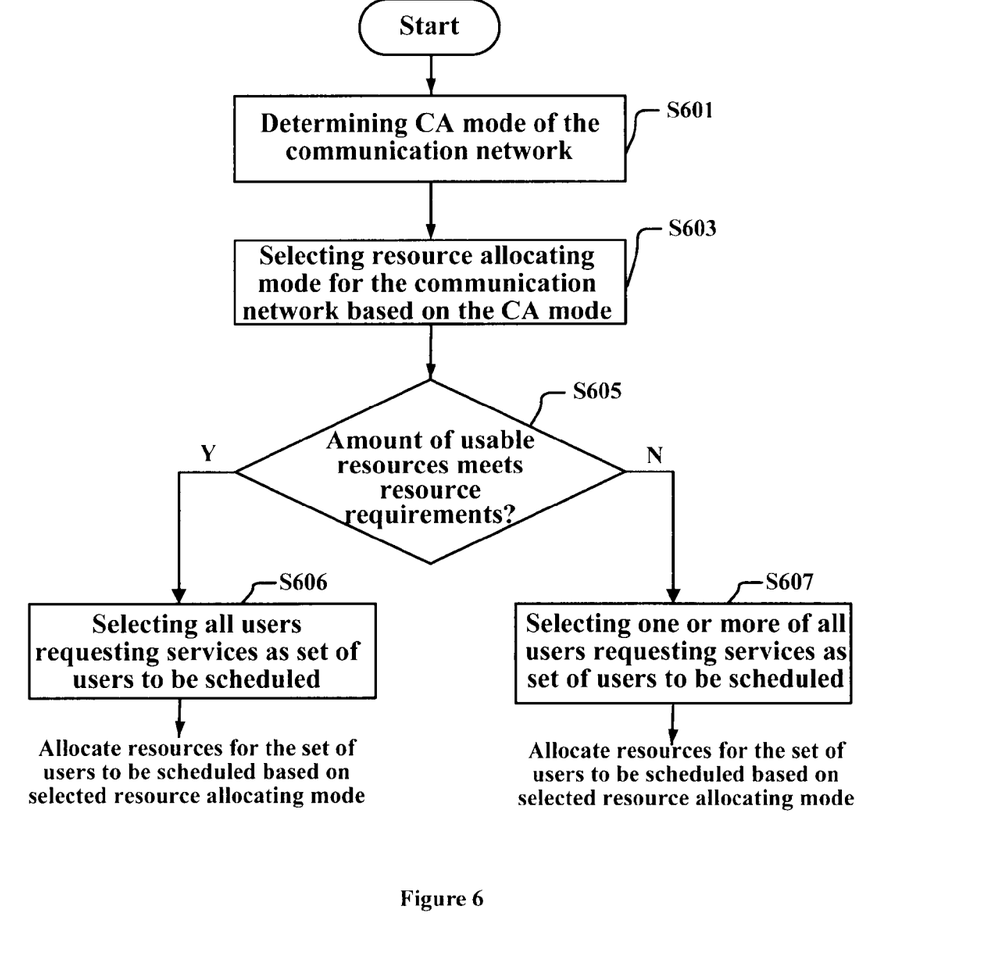
FIG. 6 is a schematic flow chart showing the method of allocating resources according to another embodiment of the invention.

FIG. 6 is a schematic flow chart showing the method of allocating resources according to another embodiment of the invention. The method shown in FIG. 6 is similar to those described above, the difference lies in that the method shown in FIG. 6 further includes a step of judging whether the amount of usable resources in the communication network meets the resource requirements of all the users requesting for services.

As shown in FIG. 6, steps S601 and S603 may be similar to those in the above embodiments, for example, similar to steps S201 and S203 in FIG. 2 or similar to steps S301, S301-1, S303-1, and S303-2 in FIG. 3, the description of which is not repeated.

In step S605, before allocating the resources, it is judged whether the amount of usable resources in the communication network meets the resource requirements of all the users requesting for services. If yes, in step S606 all the users requesting services are included in the set of users to be scheduled; otherwise, in step S607 one or more users in all the users requesting services are selected, as the set of users to be scheduled. The set of users to be scheduled may be selected according to the total amount of usable resources, as well as the users' priorities, performance indexes, and/or resource requirements, and the like.

Figure 7:
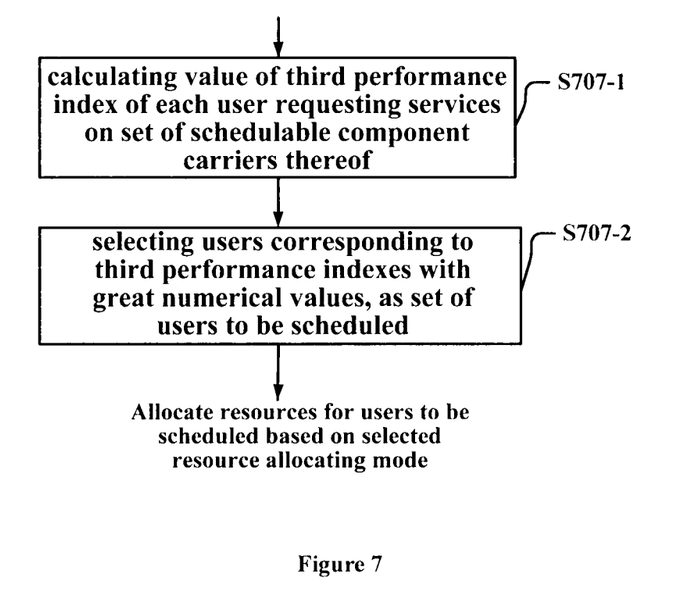
FIG. 7 is a schematic flow chart showing the process of selecting a set of users to be scheduled according to an embodiment of the invention.

FIG. 7 shows an example of step S607. The method of selecting the users shown in FIG. 7 includes steps S707-1 and S707-2. In particular, in step S707-1 the performance index (also referred to as the third performance indexes) of each user requesting services on the set of schedulable component carriers of this user is calculated. In step S707-2, one or more users corresponding to one or more third performance indexes having the largest values are selected as the set of users to be scheduled. The number of selected users may be determined based on the amount of usable resources as well as the resource requirements of the users, the description of which is not detailed here.

A particular example of the method shown in FIG. 7 is provided below. In the example, it is supposed that the set of all users requesting services is $US_u$, $u \in US_u$, $u=1, \ldots, N$. N is an integer and represents the number of users in the set. It is also supposed that the set of aggregated component carriers of a user u ($u \in US_u$) is $C_u$. The performance index $S_{u,c}$ each user u ($u \in US_u$) on each component carrier c in the set of component carriers $C_u$ supported by the user is calculated, $\exists u \in US_u$, $\forall c \in C_u$. In this example, the set of component carriers $C_u$ supported by the user may include all the component carriers that can be used by the user. The performance index $S_{u,c}$ may be signal noise ratio, channel gain, user traffic, spectrum utilization efficiency or error rate, or the like. In other words, to calculate performance index $S_{u,c}$ the user u ($u \in US_u$) on the component carrier c in the set of component carriers $C_u$ supported by the user is to calculate or estimate the signal noise ratio, channel gain, user traffic, spectrum utilization efficiency or error rate of the user on this component carrier. It should be noted, these performance indexes may be calculated or estimated using any appropriate method, the description of which is omitted herein. Then, the average performance index $S\_AVG_u$ of the user u on the set of component carriers $C_u$ supported by the user is calculated. The average performance index may be referred to as the third performance index. For a user not supporting carrier aggregation, $S\_AVG_u = S_{u,c}$, $c \in C_u$ since there is only one component carrier supported by it. For a user supporting carrier aggregation, the average performance index $S\_AVG_u$ equals to the average value of all the performance indexes $S_{u,c}$ on all the carriers c in the set $C_u$ of component carriers supported by the user u, that is:

$$S\_AVG_u = \frac{\sum_{c \in C_u} S_{u,c}}{len(C_u)},$$

here, $len(C_u)$ is an integer representing the number of elements (component carriers) in the set $C_u$. The average performance indexes $S\_AVG_u$ may be sorted based on their values in a descending order and the users corresponding to the preceding M (M≥1) $S\_AVG_u$ are selected as the set of users to be scheduled $Sch_u$. As described above, the value of M may be determined according to the practical requirements, the description of which is omitted herein.

The following is an example of selecting one or more component carriers from all the component carriers that can be used by the user in such a case, as the set of schedulable component carriers of the user. First the average performance index $S_{avg}$ of the set of users to be scheduled $Sch_u$ is calculated as follows:

$$S_{avg} = \frac{\sum_{u \in Sch_u} S\_AVG_u}{len(Sch_u)}.$$

In other words, the average performance index $S_{avg}$ of the set of users to be scheduled $Sch_u$ equals to the average value of all the third performance indexes $S\_AVG_u$ of all the users u in the set $Sch_u$. In the above formula, $len(Sch_u)$ represents the number of elements (users) in the set $Sch_u$. Then the set of schedulable component carriers $CC_{u,c}$ of each user u ($u \in Sch_u$) is determined based on the average performance index $S_{avg}$ of the set of users to be scheduled $Sch_u$. If the user u does not support carrier aggregation, the set of schedulable component carriers of it includes only the component carrier supported by the user, i.e., $CC_{u,c} = C_u$. If the user u supports carrier aggregation, the set of schedulable component carriers of it includes the following component carriers: the performance index $S_{u,c}$ of the user on each of the component carriers is higher than the average performance index $S_{avg}$ of the set of users to be scheduled $Sch_u$. That is:

$$CC_{u,c} = \{c\}, c = \arg(S_{u,c} \geq S_{avg}), u \in Sch_u, c \in C_u,$$

Thus the set of schedulable component carriers $CC_{u,c}$ of each user u ($u \in Sch_u$) of the set of users to be scheduled $Sch_u$ is determined. The performance index $S_{u,c}$ may be calculated as described above, the description of which is not repeated herein.

Figure 8:
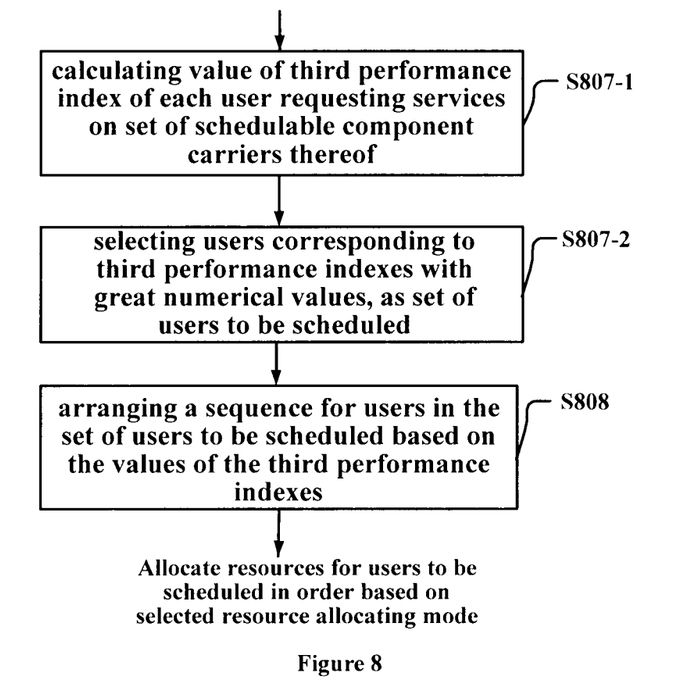
FIG. 8 is a schematic flow chart showing the process of selecting a set of users to be scheduled and sorting the users in the set according to an embodiment of the invention.

As an example, the method of allocating resources may further include a step of sorting the users in the set of users to be scheduled, in order to allocate resources to each user in the set of users to be scheduled in order. FIG. 8 shows an example of selecting the set of users to be scheduled and sorting the selected users based on their performance indexes. As shown in FIG. 8, steps S807-1 and S807-2 are similar to steps S707-1 and S707-2 in FIG. 7, the description of which is not repeated here. In step S808, the users may be sorted based on the values of the third performance indexes thereof.

As another example, the users may be sorted as follows. For example, the average performance index $SSch\_AVG_u$ (of each user u ($u \in Sch_u$) in the set $Sch_u$:

$$SSch\_AVG_u = \frac{\sum_{c \in CC_{u,c}} S_{u,c}}{len(CC_{u,c})},$$

That is, the average performance index $SSch\_AVG_u$ of the user u may be the average value of the performance indexes $S_{u,c}$ of the user on all the component carriers c in its set of schedulable component carriers $CC_{u,c}$. Here, $len(CC_{u,c})$ represents the number of elements (component carriers) in the set. All users in the set of users to be scheduled may be sorted based on their average performance indexes $SSch\_AVG_u$ in a descending order and resources may be allocated to the users in such an order, until all the users to be scheduled are provided with sufficient resources or until all usable resources in the communication network are allocated.

As another example, the users in the set of users to be scheduled may be sorted based on their priorities.

Of course, other appropriate method can be used to sort the users in other examples ant the invention is not limited to the above described examples.

With the method of allocating resources described above, the throughput of the system and spectrum utilization efficiency may be improved effectively. Further, the fairness among the users may be improved. Especially when user terminals supporting carrier aggregation and user terminals not supporting carrier aggregation coexist, the method may effectively solve the problem of fairness between the types of terminals. In addition, with the method of allocating resources described above, multi-user diversity gain may also be improved.

Figure 9:
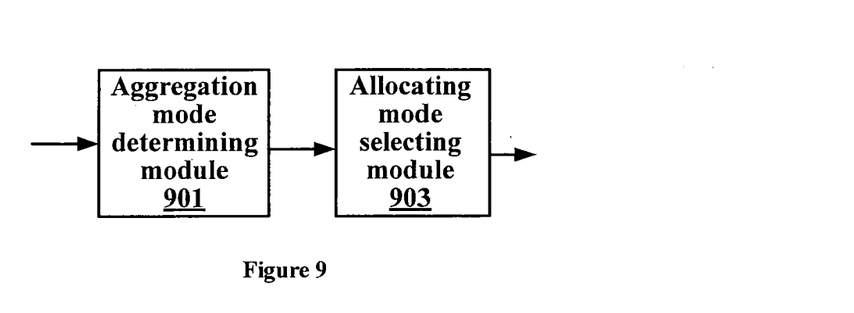
FIG. 9 is a schematic block diagram showing the apparatus of allocating resources according to an embodiment of the invention.

FIG. 9 is a schematic block diagram showing an apparatus for allocating resources according to an embodiment of the invention. As shown in FIG. 9, the apparatus for allocating resources includes an aggregation mode determining module 901 and an allocating mode selecting module 903. The aggregation mode determining module 901 is configured to determine the carrier aggregation mode of the communication network. The allocating mode selecting module 903 is configured to select the resource allocating mode of the communication network according to the carrier aggregation mode of the communication network.

Similar to the above method embodiments or examples, the so called communication network refers to a communication system that supports carrier aggregation, for example, the communication network shown in FIG. 1. The communication network may include nodes not supporting carrier aggregation, such as terminal 102 in FIG. 1, and may further include nodes supporting carrier aggregation, such as terminals 103 and 104 shown in FIG. 1. In an example, the allocating mode selecting module may determine the carrier aggregation mode supported by the communication network via the main node (e.g. the base station) of the communication network.

By using the apparatus for allocating resources, different methods of allocating resources may be selected based on different application scenarios of carrier aggregation, thereby effectively improving the frequency diversity gain of the system.

As described above, the carrier aggregation modes of the communication network may be classified as two types, i.e. consecutive carrier aggregation (e.g. CC1 and CC2 shown in FIG. 1) and non-consecutive carrier aggregation (e.g. CC1 and CC3 shown in FIG. 1). As an example, different resource allocating modes may be selected for these two different aggregation modes. In particular, the allocating mode selecting module 903 may be configured to: select a centralized resource allocating mode for allocating the resources of the communication network if the carrier aggregation mode of the communication network is determined by the aggregation mode determining module 901 to be a non-consecutive carrier aggregation mode; and select a distributed resource allocating mode for allocating the resources of the communication network if the carrier aggregation mode of the communication network is determined by the aggregation mode determining module 901 to be a consecutive carrier aggregation mode.

Figure 10:
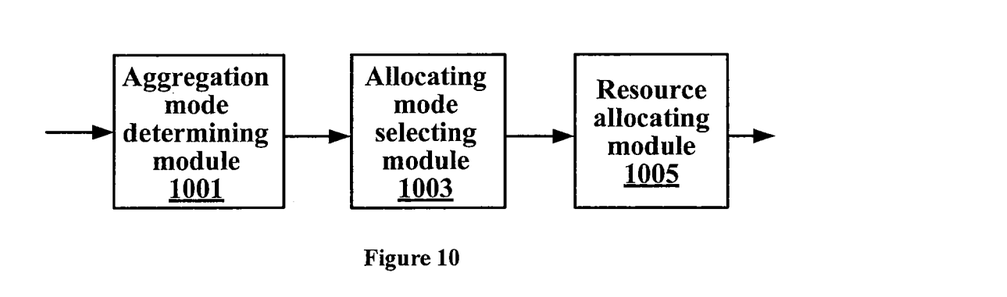
FIG. 10 is a schematic block diagram showing the apparatus of allocating resources according to another embodiment of the invention.

FIG. 10 is a schematic block diagram showing an apparatus for allocating resources according to another embodiment of the invention. The apparatus for allocating resources shown in FIG. 10 includes an aggregation mode determining module 1001, an allocating mode selecting module 1003 and a resource allocating module 1005.

The aggregation mode determining module 1001 and the allocating mode selecting module 1003 are similar to the modules 901 and 902 described above, respectively, the description of which is not repeated.

The resource allocating module 1005 is configured to allocate resources according to the selected resource allocating mode.

If the centralized resource allocating mode is selected, the resource allocating module 1005 is configured to: calculate, for each user in a set of users to be scheduled in the communication network, a value of a first performance index of the each user on each allocable resource block in a set of schedulable component carriers of the each user; and select, among all resource blocks in the set of schedulable component carriers of the each user, one or more resource blocks corresponding to first performance indexes with great numerical values, and allocate the selected resource blocks to the each user.

Similar to the above method embodiment or example, the first performance index may include user traffic, channel gain, signal noise ratio, spectrum utilization efficiency or error rate, or the like. As appreciated by those skilled in the art, the performance index may be selected according to the practical application requirements, and is not numerated herein. The resource allocating module may calculate the first performance index by using the method in the above method embodiments or examples, the description of which is not repeated herein.

In an example, the schedulable component carriers of a user may include all the component carriers that can be used by the user. For a user not supporting carrier aggregation, the schedulable component carriers of the user includes only a component carrier used by the user. In another example, the schedulable component carriers of a user may include one or more of all the component carriers that can be used by the user the user.

As an example, the resource blocks corresponding to a plurality of the first performance indexes of the largest values may be allocated to the user according to the values of the first performance indexes of the user on the resource blocks. As another example, a plurality of resource blocks corresponding to the first performance indexes of the larger values (not only the largest values) may be allocated to the user. Of course, the method of selecting resource blocks is only illustrative. Those skilled in the art will appreciate that the invention is not limited to the examples.

As can be appreciated, the number of resource blocks allocated to a user may be determined as required, e.g. according to the user's resource requirements, the description of which is not detailed. As can also be appreciated, for a user supporting carrier aggregation, in the above allocating step resource blocks in a plurality of consecutive or non-consecutive component carriers may be allocated to the user; while for a user not supporting carrier aggregation, only the resource blocks in the component carrier supported by the user may be allocated to the user.

In an example, before allocating a resource block to the user, the resource allocating module 1005 may be further configured to: judge whether the user meets the condition (also referred to the first condition) for occupying the resource block. The first condition may include that: component carriers schedulable by the user and resource blocks therein can not be occupied by other users, the number of times that this resource block is multiplexed does not exceed the number of transmission antennas, and/or the number of resource blocks occupied by each user does not exceed number of the receiving antennas, and the like. It shall be noted the conditions mentioned here are not exhaustive. Those skilled in the art may use other appropriate conditions in judging whether a user can occupy a resource block and the invention is not limited to the examples.

If the distributed resource allocating mode is selected, the resource allocating module 1005 is configured to: calculate, for each user in a set of users to be scheduled in the communication network, values of a second performance index of the each user on allocable resource blocks in a set of schedulable component carriers of the each user; and for each component carrier in the set of schedulable component carriers of the each user, select, among resource blocks in the each component carrier, a resource block corresponding to a greater value of the second performance index, and allocate the selected resource block to the each user.

Similar to the above method embodiments or examples, the second performance index may be user traffic, channel gain, signal noise ratio, spectrum utilization efficiency or error rate, or the like. Those skilled in the art shall appreciate that these performance indexes can be selected according to practical requirements, the description of which is omitted herein. The resource allocating module may calculate the second performance index by using the method described above, the description of which is not repeated herein.

As an example, a plurality of resource blocks in each component carrier in the set of schedulable component carriers of the user may be sorted according to the values of the corresponding second performance indexes, and the resource blocks corresponding to the largest second performance index may be allocated to the user. As another example, among the plurality of resource blocks in each component carrier, the resource blocks corresponding to larger second performance index (not only the largest) may be selected for the user according to the practical requirements. Of course, the method for selecting resource blocks is only illustrative. Those skilled in the art shall appreciate that the invention is not limited to the examples.

As can be appreciated, for a user supporting carrier aggregation, the resource allocating module 1005 may select resource blocks among each component carrier in the set of schedulable component carriers of the user and allocate the selected resource blocks to the user; and for a user not supporting carrier aggregation, the resource allocating module 1005 select only the resource blocks in the component carrier supported by the user and allocate the selected resource blocks to the user.

As an example, after the above resource allocation is executed for all the users in the set of users to be scheduled, if the communication network still has some schedulable resources remained and some users' resource requirements have not been met, the resource allocating module 1005 may execute the above distributed resource allocation to allocate the remaining resources to the users.

In an example, before allocating a resource block to the user, the resource allocating module 1005 may be configured to: judge whether the user meets the condition (also referred to as the second condition) for occupying the resource block. The second condition may include the following: the component carriers schedulable by the user and the resource blocks therein can not be occupied by other users, the number of times that the resource block is multiplexed does not exceed the number of transmission antennas, and/or the number of resource blocks occupied by each user does not exceed the number of receiving antennas, and the like. It should be noted that the conditions mentioned herein are illustrative, rather than exhaustive. Those skilled in the art may utilize other conditions in judging whether the user may occupy a certain resource block and the invention is not limited to the example.

Figure 11:
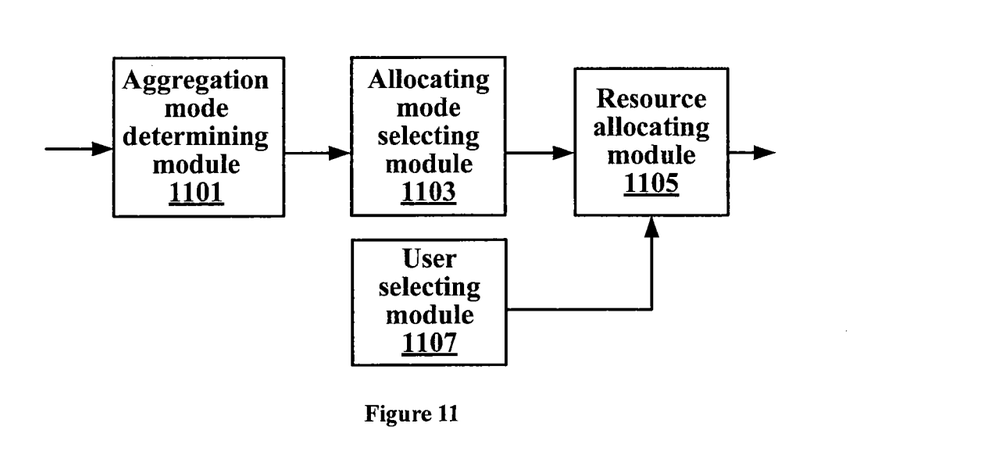
FIG. 11 is a schematic block diagram showing the apparatus of allocating resources according to another embodiment of the invention.

FIG. 11 is a schematic block diagram showing an apparatus for allocating resources according to another embodiment of the invention. The apparatus for allocating resources shown in FIG. 11 is similar to those in the above embodiments, the difference lies in that, in addition to an aggregation mode determining module 1101, an allocating mode selecting module 1103 and a resource allocating module 1105, the apparatus for allocating resources shown in FIG. 11 further includes a user selecting module 1107.

The aggregation mode determining module 1101, the allocating mode selecting module 1103 and the resource allocating module 1105 are similar to the corresponding modules described in the above embodiment, the description of which is not repeated herein.

The user selecting module 1107 is configured to judge whether an amount of available resources in the communication network meets resource demands of all users requesting to be served, and if yes, include all the users requesting to be served in the set of users to be scheduled, and if no, select, among all the users requesting to be served, one or more users as the set of users to be scheduled. As an example, the user selecting module 1107 is further configured to calculate a value of the second performance index of each user requesting to be served on a set of schedulable component carriers thereof; and select the users corresponding to one or more greater values of the second performance index, as the set of users to be scheduled. The user selecting module 1107 may utilize the method described in the above method embodiments or examples (for example, the embodiment shown in FIG. 7) to determine the set of uses to be scheduled, the description of which is not repeated herein.

Figure 12:
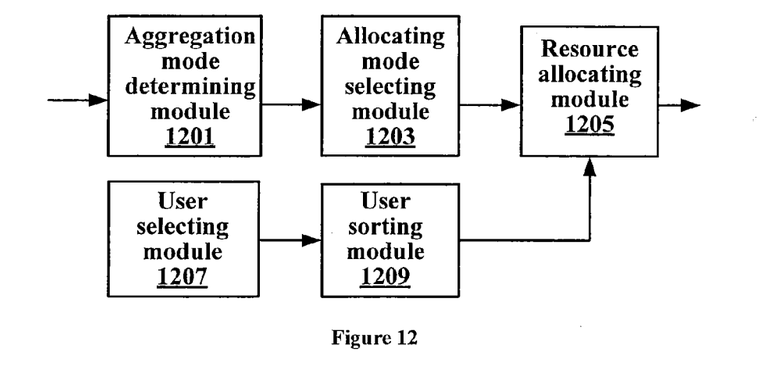
FIG. 12 is a schematic block diagram showing the apparatus of allocating resources according to another embodiment of the invention.

FIG. 12 is a schematic block diagram showing an apparatus for allocating resources according to another embodiment of the invention. The apparatus for allocating resources shown in FIG. 12 is similar to that in the above FIG. 11, the difference lies in that, in addition to an aggregation mode determining module 1201, an allocating mode selecting module 1203, a resource allocating module 1205 and a user selecting module 1207, the apparatus for allocating resources shown in FIG. 12 further includes a user sorting module 1209.

The aggregation mode determining module 1201, the allocating mode selecting module 1203, the resource allocating module 1205 and the user selecting module 1207 are similar to the corresponding modules in the above embodiment, the description of which is not repeated herein.

The user sorting module 1209 is configured to arrange a sequence for users in the set of users to be scheduled, thus the resource allocating module 1205 allocates the resources to each user in the set of users to be scheduled according to the sequence. The user sorting module 1209 may sort the users by using the method described in the above embodiments or examples, the description of which is not repeated herein.

With the apparatus of allocating resources described above, the throughput of the system and spectrum utilization efficiency may be improved effectively. Further, the fairness among the users may be improved. Especially when user terminals supporting carrier aggregation and user terminals not supporting carrier aggregation coexist, the apparatus may effectively solve the problem of fairness between the types of terminals. In addition, with the apparatus of allocating resources described above, multi-user diversity gain may also be improved.

It should be understood that the above embodiments and examples are illustrative, rather than exhaustive. The present disclosure should not be regarded as being limited to any particular embodiments or examples stated above.

In the above embodiments and examples, the expressions, such as "the first", "the second", and "the third" (e.g. the first performance index, the second performance index and the first condition, the second condition, and the like), are used. Those skilled in the art will appreciate that such expressions are used merely to differentiate the terms in literal, and should not be considered as defining the sequence or the like of the terms.

As an example, the components, units or steps in the above resource allocating apparatuses and methods can be configured with software, hardware, firmware or any combination thereof in the main node (e.g. the base station) of the communication network, as part of the resource scheduling (allocating) apparatus in the MAC (Media Access Control) layer of the base station. The components, units or steps in the above resource allocating apparatuses and methods can be configured with software, hardware, firmware or any combination thereof by using any appropriate means or manners known in the art, the description of which is not detailed herein.

As an example, the above resource allocating apparatuses and methods can be realized in an existing resource scheduling (allocating) apparatus of the base station by modifying the components of the existing resource scheduling apparatus.

Figure 13:
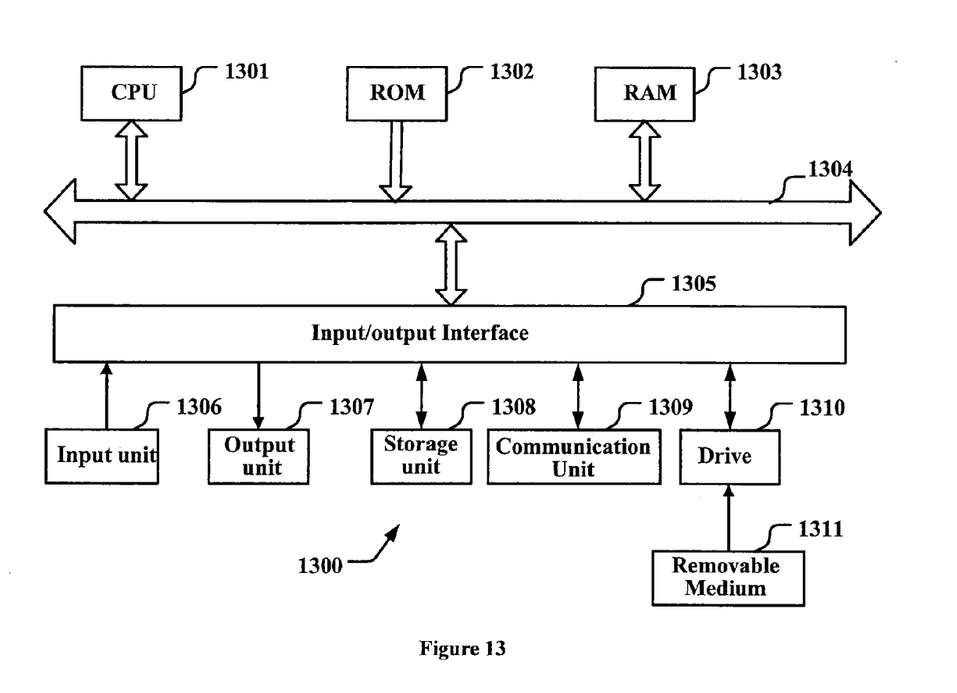
FIG. 13 is a schematic block diagram illustrating the structure of a computer for realizing some embodiment of the invention.

As an example, in the case of using software or firmware, programs constituting the software for realizing the above method or apparatus can be installed to a computer with a specialized hardware structure (e.g. the general purposed computer 1300 as shown in FIG. 13) from a storage medium or a network. The computer, when installed with various programs, is capable of carrying out various functions.

In FIG. 13, a central processing unit (CPU) 1301 executes various types of processing in accordance with programs stored in a read-only memory (ROM) 1302, or programs loaded from a storage unit 1308 into a random access memory (RAM) 1303. The RAM 1303 also stores the data required for the CPU 1301 to execute various types of processing, as required. The CPU 1301, the ROM 1302, and the RAM 1303 are connected to one another through a bus 1304. The bus 1304 is also connected to an input/output interface 1305.

The input/output interface 1305 is connected to an input unit 1306 composed of a keyboard, a mouse, etc., an output unit 1307 composed of a cathode ray tube or a liquid crystal display, a speaker, etc., the storage unit 1308, which includes a hard disk, and a communication unit 1309 composed of a modem, a terminal adapter, etc. The communication unit 1309 performs communicating processing. A drive 1310 is connected to the input/output interface 1305, if needed. In the drive 1310, for example, removable media 1311 is loaded as a recording medium containing a program of the present invention. The program is read from the removable media 1311 and is installed into the storage unit 1308, as required.

In the case of using software to realize the above consecutive processing, the programs constituting the software may be installed from a network such as Internet or a storage medium such as the removable media 1311.

Those skilled in the art should understand the storage medium is not limited to the removable media 1311, such as, a magnetic disk (including flexible disc), an optical disc (including compact-disc ROM (CD-ROM) and digital versatile disk (DVD)), an magneto-optical disc (including an MD (Mini-Disc) (registered trademark)), or a semiconductor memory, in which the program is recorded and which are distributed to deliver the program to the user aside from a main body of a device, or the ROM 1302 or the hard disc involved in the storage unit 1308, where the program is recorded and which are previously mounted on the main body of the device and delivered to the user.

The present disclosure further provides a program product having machine-readable instruction codes which, when being executed, may carry out the methods according to the embodiments.

Accordingly, the storage medium for bearing the program product having the machine-readable instruction codes is also included in the disclosure. The storage medium includes but not limited to a flexible disk, an optical disc, a magneto-optical disc, a storage card, or a memory stick, or the like.

In the above description of the embodiments, features described or shown with respect to one embodiment may be used in one or more other embodiments in a similar or same manner, or may be combined with the features of the other embodiments, or may be used to replace the features of the other embodiments.

As used herein, the terms the terms "comprise," "include," "have" and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

Further, in the disclosure the methods are not limited to a process performed in temporal sequence according to the order described therein, instead, they can be executed in other temporal sequence, or be executed in parallel or separatively. That is, the executing orders described above should not be regarded as limiting the method thereto.

While some embodiments and examples have been disclosed above, it should be noted that these embodiments and examples are only used to illustrate the present disclosure but not to limit the present disclosure. Various modifications, improvements and equivalents can be made by those skilled in the art without departing from the scope of the present disclosure. Such modifications, improvements and equivalents should also be regarded as being covered by the protection scope of the present disclosure.

The invention claimed is:

1. A method for allocating resources in a communication network, comprising:
   determining, by circuitry of an apparatus, whether a carrier aggregation mode of the communication network is consecutive or non-consecutive;
   selecting, by the circuitry, one of a centralized resource allocating mode and a distributed resource allocating mode according to the determined carrier aggregation mode; and
   allocating the resources to a user in a set of users supporting carrier aggregation to be scheduled in the communication network using one of the centralized resource allocating mode and the distributed resource allocating mode, wherein
   when the allocating the resources is performed using the centralized resource allocating mode, the allocating the resources includes selecting one or more resource blocks to be allocated to the user from a set of schedulable component carriers usable by the user, and
   when the allocating the resources is performed using the distributed resource allocating mode, the allocating the resources includes selecting at least one resource block to be allocated to the user from each of a plurality of component carriers usable by the user.

2. The method according to claim 1, wherein the step of selecting the one of the centralized resource allocating mode and the distributed resource allocating mode comprises:
   when the carrier aggregation mode is determined to be a non-consecutive carrier aggregation mode, selecting the centralized resource allocating mode for allocating the resources; and
   when the carrier aggregation mode is determined to be a consecutive carrier aggregation mode, selecting the distributed resource allocating mode for allocating the resources.

3. The method according to claim 2, wherein, when the allocating the resources is performed using the centralized resource allocating mode, the allocating the resources comprises:
   for each user in the set of users supporting carrier aggregation to be scheduled in the communication network, calculating a value of a first performance index on each allocable resource block in a set of schedulable component carriers of the respective user; and selecting, among all resource blocks in the set of schedulable component carriers of the respective user, the one or more resource blocks for which the values of the first performance indexes of the respective user meets a predetermined requirement, and allocating the selected one or more resource blocks to the respective user.

4. The method according to claim 3, wherein the set of schedulable component carriers of each of the users comprises all component carriers usable by the respective user, or comprises one or more component carriers among all component carriers usable by the respective user.

5. The method according to claim 2, wherein, when the allocating the resources is performed using the distributed resource allocating mode, the allocating the resources comprises:

for each user in the set of users supporting carrier aggregation to be scheduled in the communication network, calculating values of a second performance index of the respective user on allocable resource blocks in a set of schedulable component carriers of the respective user; and for each component carrier in the set of schedulable component carriers of the respective user, selecting, among resource blocks in the respective component carrier, at least one resource block for which the value of the second performance index of the respective user meets a predetermined requirement, and allocating the selected at least one resource block to the respective user.

6. The method according to claim 5, wherein the set of schedulable component carriers of each of the users comprises all component carriers usable by the respective user, or comprises one or more component carriers among all component carriers usable by the respective user.

7. The method according to claim 1, further comprising:

judging whether an amount of available resources in the communication network meets resource demands of all users requesting to be served;

when the amount of available resources in the communication network is judged to meet the resource demands of all the users requested to be served, including all the users requesting to be served in a set of users to be scheduled; and when the amount of available resource in the communication network is judged not to meet the resource demands of all the users requested to be served, selecting, among all the users requesting to be served, one or more users as the set of users to be scheduled.

8. The method according to claim 7, wherein the selecting among all the users requesting to be served the one or more users as the set of users to be scheduled comprises:

calculating a value of a third performance index of each of the users requesting to be served on a set of schedulable component carriers thereof; and selecting the one or more users according to the values of the third performance indexes, as the set of users to be scheduled.

9. The method according to claim 7, further comprising:
arranging a sequence for the users in the set of users to be scheduled,
wherein the resources are allocated to each of the users in the set of users to be scheduled according to the sequence.

10. An apparatus for allocating resources in a communication network, comprising:

circuitry configured to determine whether a carrier aggregation mode of the communication network is consecutive or non-consecutive;

select one of a centralized resource allocating mode and a distributed resource allocating mode according to the determined carrier aggregation mode; and allocate the resources to a user in a set of users supporting carrier aggregation to be scheduled in the communication network using one of the centralized resource allocating mode and the distributed resource allocating mode, wherein the centralized resource allocating mode causes the circuitry to select one or more resource blocks to be allocated to the user from a set of schedulable component carriers usable by the user, and the distributed resource allocating mode causes the circuitry to select at least one resource block to be allocated to the user from each of a plurality of component carriers usable by the user.

11. The apparatus according to claim 10, wherein the circuitry is further configured to:

select the centralized resource allocating mode for allocating the resources, when the carrier aggregation mode is determined by the circuitry to be a non-consecutive carrier aggregation mode; and select the distributed resource allocating mode for allocating the resources, when the carrier aggregation mode is determined by the circuitry to be a consecutive carrier aggregation mode.

12. The apparatus according to claim 11, wherein the circuitry is further configured to:

calculate, when the centralized resource allocating mode is selected, for each user in the set of users supporting carrier aggregation to be scheduled in the communication network, a value of a first performance index of the respective user on each allocable resource block in a set of schedulable component carriers of the respective user; and select, among all resource blocks in the set of schedulable component carriers of the respective user, the one or more resource blocks on which the values of the first performance indexes of the respective user meets a predetermined requirement, and allocate the selected one or more resource blocks to the respective user.

13. The apparatus according to claim 12, wherein the set of schedulable component carriers of each of the users comprises all component carriers usable by the respective user, or comprises one or more component carriers among all component carriers usable by the respective user.

14. The apparatus according to claim 12, wherein the circuitry is further configured to:

judge whether the user meets a first condition of occupying the resource block before allocating the resource block to the user.

15. The apparatus according to claim 11, wherein the circuitry is further configured to:

calculate, when the distributed resource allocating mode is selected, for each user in the set of users supporting carrier aggregation to be scheduled in the communication network, a value of a second performance index of the respective user on allocable resource blocks in the set of schedulable component carriers of the respective user; and for each component carrier in the set of schedulable component carriers of the respective user, select, among resource blocks in the respective component carrier, at least one resource block for which the value of the second performance index of the respective user meets a predetermined requirement, and allocate the selected at least one resource block to the respective user.

16. The apparatus according to claim 15, wherein the set of schedulable component carriers of each of the users comprises all component carriers usable by the respective user, or comprises one or more component carriers among all component carriers usable by the respective user.

17. The apparatus according to claim 15, wherein the circuitry is further configured to:
judge whether the user meets a second condition of occupying the resource block before allocating the resource block to the user.

18. The apparatus according to claim 10, wherein the circuitry is further configured to:
judge whether an amount of available resources in the communication network meets resource demands of all users requesting to be served,
when the amount of the available resources in the communication network is judged to meet the resource demands of all the users requesting to be served, include all the users requesting to be served in a set of users to be scheduled, and
when the amount of the available resources in the communication network is judged not to meet the resource demands of all the users requesting to be served, select, among all the users requesting to be served, one or more users as the set of users to be scheduled.

19. The apparatus according to claim 18, wherein the circuitry is further configured to:
calculate a value of a third performance index of each of the users requesting to be served on a set of schedulable component carriers thereof; and
select one or more users according to the values of the third performance indexes, as the set of users to be scheduled.

20. The apparatus according to claim 18, wherein the circuitry is further configured to:
arrange a sequence for the users in the set of users to be scheduled, and
allocate the resources to each of the users in the set of users to be scheduled according to the sequence.

21. The apparatus according to claim 10, wherein the apparatus is implemented as a base station.

22. An apparatus for utilizing resources in a communication network, comprising:
circuitry configured to
determine an ability of supporting carrier aggregation of a user; and
acquire, based on the ability of supporting carrier aggregation, resources allocated from a base station using one of a centralized resource allocating mode and a distributed resource allocating mode based on whether a carrier aggregation mode of the communication network is consecutive or non-consecutive,
when the centralized resource allocating mode is used, acquire one or more resource blocks allocated from a set of schedulable component carriers usable by the user, and
when the distributed resource allocating mode is used, acquire at least one resource block from each of a plurality of component carriers usable by the user.

* * * * *